United States Patent
Howe et al.

[11] Patent Number: 6,145,052
[45] Date of Patent: Nov. 7, 2000

[54] DISK DRIVE WITH ADAPTIVE POOLING FOR COMMAND REORDERING

[75] Inventors: Steven M. Howe; Jeffrey L. Williams, both of Rochester, Minn.

[73] Assignee: Western Digital Corporation, Irvine, Calif.

[21] Appl. No.: 08/963,772

[22] Filed: Nov. 4, 1997

[51] Int. Cl.[7] .................................................. G06F 12/00
[52] U.S. Cl. ............................... 711/112; 711/151; 710/6; 710/43; 710/45
[58] Field of Search ........................... 711/111, 112, 101, 711/114, 158, 167, 151; 710/6, 43, 45

[56] References Cited

U.S. PATENT DOCUMENTS

| | | | |
|---|---|---|---|
| 5,729,718 | 3/1998 | Au | 711/167 |
| 5,765,204 | 6/1998 | Bakke et al. | 711/202 |
| 5,787,482 | 7/1998 | Chen et al. | 711/158 |

FOREIGN PATENT DOCUMENTS 0 757 310 A2  5/1997  European Pat. Off. .

*Primary Examiner*—John W. Cabeca
*Assistant Examiner*—Matthew D. Anderson
*Attorney, Agent, or Firm*—Milad G. Shara

[57] ABSTRACT

A method for selecting a next command to execute from a set of SCSI commands where the commands are gracefully aged and performance of a disk drive is improved. An execution threshold age, a pool threshold age, and an age threshold age are used to determine what command is executed next. A mechanical time delay is calculated for a command based on the time required to position the read/write head over the data location requested in each command. A command age is calculated based on a current time and the time the command was received from the host. The command age is checked against the execution threshold age and pool threshold age. Any commands that have aged beyond the execution threshold age are executed. If the oldest command has aged beyond the age threshold age, then any command that has both aged beyond the pool threshold age and has the smallest mechanical time delay is executed, otherwise the command with the smallest mechanical time delay is executed. Alternatively, a time stamp of the oldest command is compared against an age threshold to determine if all or some of the commands are in the pool of commands. If there are no commands that have aged beyond the age threshold, then the command that has the smallest mechanical time delay is executed first.

26 Claims, 8 Drawing Sheets

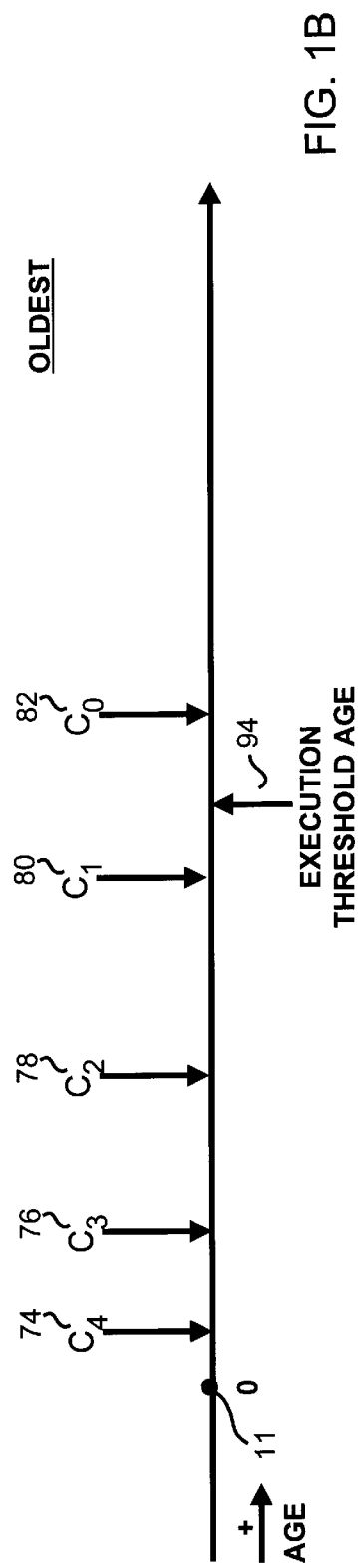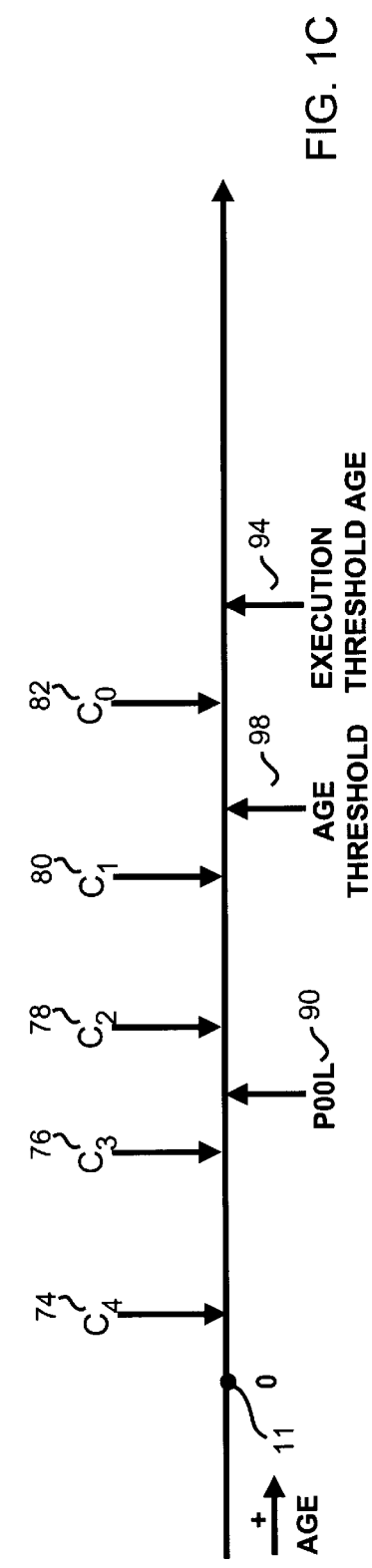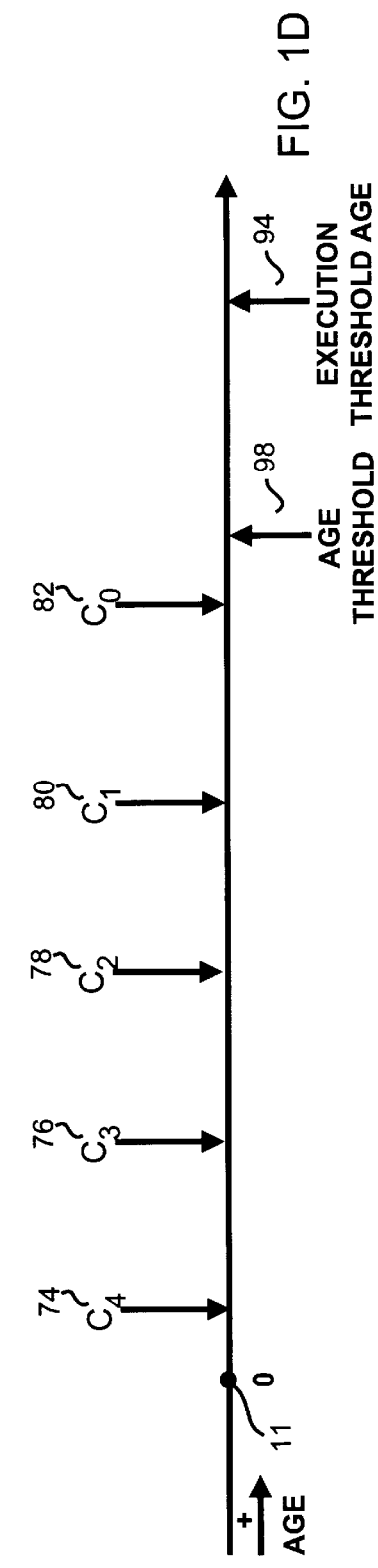

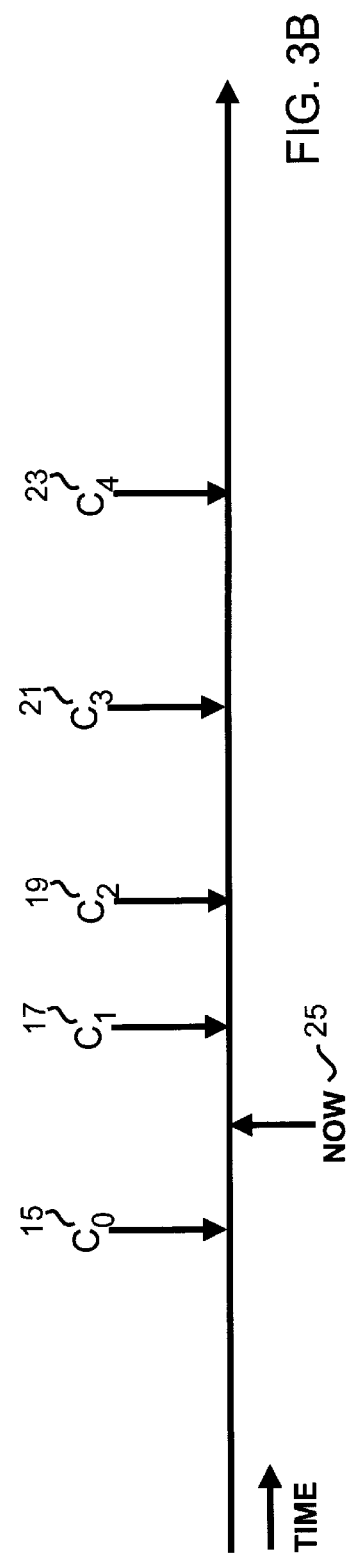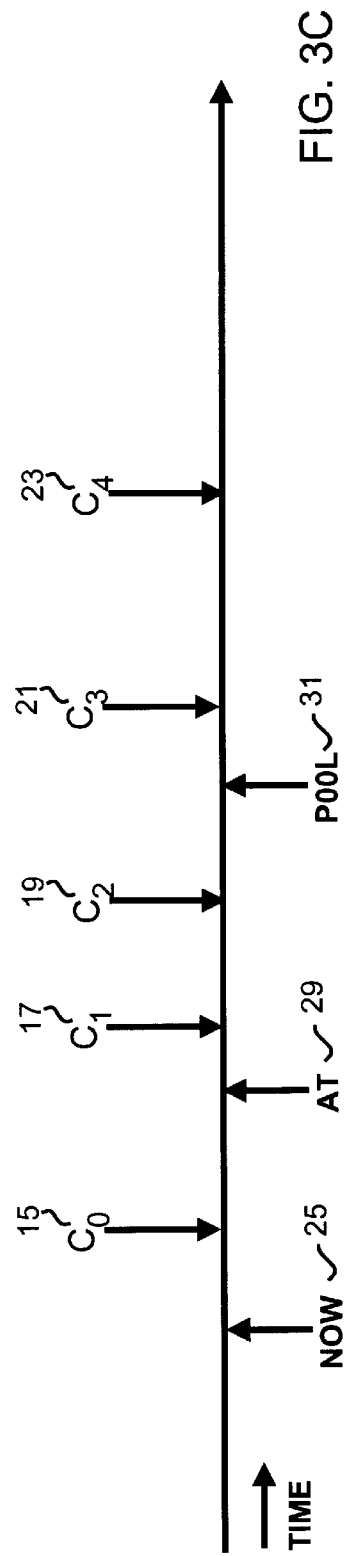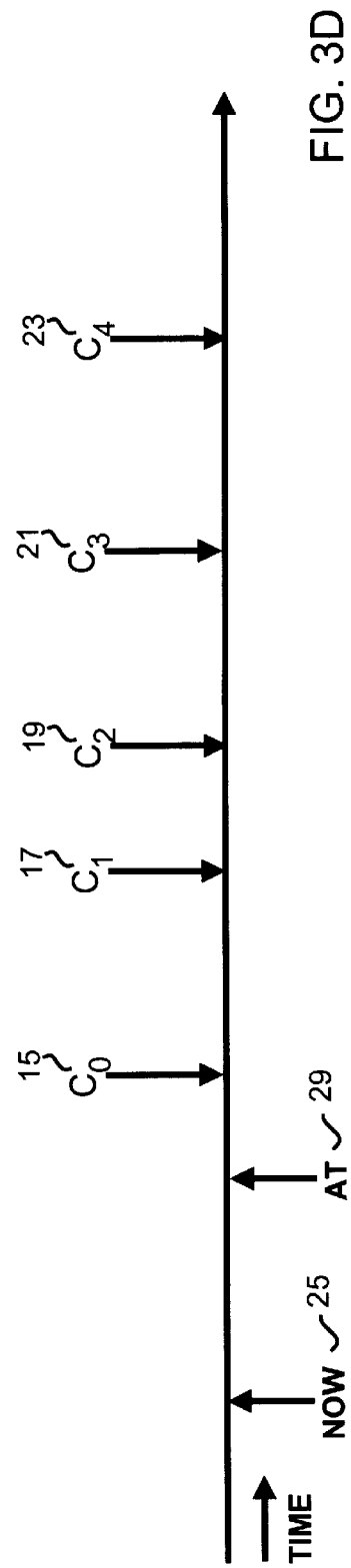

DISK DRIVE WITH ADAPTIVE POOLING FOR COMMAND REORDERING

A portion of the disclosure of this patent document contains material which is subject to copyright protection. The copyright owner has no objection to the facsimile reproduction by any one of the patent disclosure, as it appears in the Patent and Trademark Office patent files or records, but otherwise reserves all copyright rights whatsoever.

The invention relates to a method of controlling a disk drive to determine which command to execute from a queue of commands and more particularly to a method to adaptively pool commands for command reordering to improve performance and reduce time-outs.

BACKGROUND OF THE INVENTION

Disk drives interface to a host computer over a host bus. The host computer transmits commands, also known as requests, to read or write data to the disk drive on the host bus. Some host bus interfaces may be characterized as "intelligent" meaning that the device receiving the commands is able to queue commands for optimal execution efficiency. One such bus interface is the Small Computer System Interface, or SCSI bus interface. Conventionally data on a SCSI disk drive is addressed by the host using discrete sequential logical blocks rather than by physical addressing such as head/cylinder/sectors. Read and write commands arrive from the host computer specifying a starting logical block address, also known as a starting LBA, and an LBA range or number of blocks to be transferred. The disk drive then translates an LBA into a physical location on a disk in the disk drive. Conventionally logical blocks are written sequentially on the disk.

A disk drive may be processing a current command when the host sends additional commands. The disk drive may order the commands by arrival time in a queue. The disk drive must then decide what command to execute next. The process of deciding what command to execute next is often handled by a command manager program running in the disk drive. The command manager program determines the order of execution of commands. The order of execution of the commands has an impact on the performance of the disk drive. When a command is not executed in order of arrival time, the command is said to have been "reordered". The process of changing the order of execution of commands is known as "command reordering".

When reordering commands the disk drive may take into account a number of factors including: the age of the command, the mechanical time delay involved in executing the command, and a host time-out period. The host expects the command to have been completed before the host timeout period has expired. The mechanical time delay for a given command may be calculated based on the current location of the read/write head and the location of the data for that command.

Prior art methods of command reordering include real time and non real time methods. Non real time methods do not take into account time constraints of requests. Real time methods take time constraints of requests into account. A review of these types of methods can be found in European Patent Application EP0757310A2 entitled "Controlling Disk Drives". The shortest time first, STF, algorithm considers both seek time and rotational latency but suffers from starvation of commands that are far from the current position. One variant of the shortest time first algorithm, the weighted STF, applies an aging function to the time computed by the shortest time first algorithm. The weighting attempts to solve the starvation problem of the STF algorithm. Other attempts include providing a window of a predetermined number of commands from the oldest command, and if there is enough time to complete more than one command, selecting commands in that window that are in an "elevator" scan to the oldest command. An "elevator" scan heads the arm in the direction of the oldest command and executes commands that are near a scan path to the oldest command.

The highly competitive market for disk drives indicates a continuing need for a better method of selecting commands to achieve higher rates of data transfer without increasing the probability of command timeouts.

SUMMARY OF THE INVENTION

The invention provides a method of selecting commands to execute in a disk drive. When commands are within a range of a threshold age, the commands are used to form a pool of candidates. The next command to execute is selected from the pool of candidates. Since a pool of older commands is used rather than just the oldest command, the mechanical delays can be reduced by picking the one command from this aged pool that will cause the least mechanical time delay. If a command still reaches the threshold age, it will be executed next to prevent command time-outs. If no commands are within a range of the threshold, the entire set of commands is used as the pool of candidates.

The invention further provides a method for selecting a next command to execute in a disk drive. The disk drive has an intelligent interface for communicating to a host and a read/write head positioned by an actuator. The disk drive receives a plurality of commands from the host, wherein each one of the plurality of commands has associated requested data with a data location on a disk. The disk drive experiences a mechanical time delay when positioning the read/write head to the data location. The time a command was received from the host is recorded for each one of the plurality of commands. An execution threshold age, an age threshold age, and a pool threshold age are provided. A mechanical time delay is calculated for each one of the plurality of commands based on the time required to position the read/write head over the data location requested in each command. A command age is calculated for each one of the plurality of commands based on a current time and the time the command was received from the host. The invention executes any command that has aged beyond the execution threshold age. If no command has aged beyond the execution threshold age, then the invention checks if the oldest command has aged beyond the age threshold age. If the oldest command has aged beyond the age threshold age, then the invention executes the command that has both aged beyond the pool threshold age and has the smallest mechanical time delay. If the oldest command has not aged beyond the age threshold age, then the invention executes the command with the smallest mechanical time delay.

The invention also provides a method to select a next command to execute by providing an execution threshold age, an age threshold and a pool threshold age. A time stamp is applied to each one of the plurality of commands that equals the time the command has arrived plus the execution threshold age. If the time stamp of the oldest command is earlier than the current time then the invention executes the oldest command. If the time stamp of the oldest command is later than the current time and earlier than the current time plus the age threshold then the invention creates a pool of candidate commands from each one of the plurality of commands whose time stamp is earlier than the current time plus the pool threshold age. If the time stamp of the oldest command is later than the current time and later than the current time plus the age threshold then the invention creates a pool of candidate commands from all the plurality of commands. If the time stamp of the oldest command is later than the current time the invention selects a command to execute from the pool of candidate commands.

The invention beneficially provides a method to ensure that SCSI commands received by a disk drive connected with a SCSI bus are efficiently completed within a given time period thus improving system performance.

BRIEF DESCRIPTION OF THE DRAWINGS

To illustrate this invention, a preferred embodiment will be described herein with reference to the accompanying drawings.

FIGS. 1B, 1C, and 1D are schematic timing diagrams showing the relationship between command ages and threshold ages.

FIGS. 3B, 3C, and 3D are schematic timing diagrams showing the relationship between command time stamps and age thresholds.

DETAILED DESCRIPTION OF THE PREFERRED EMBODIMENT

Figure 5:
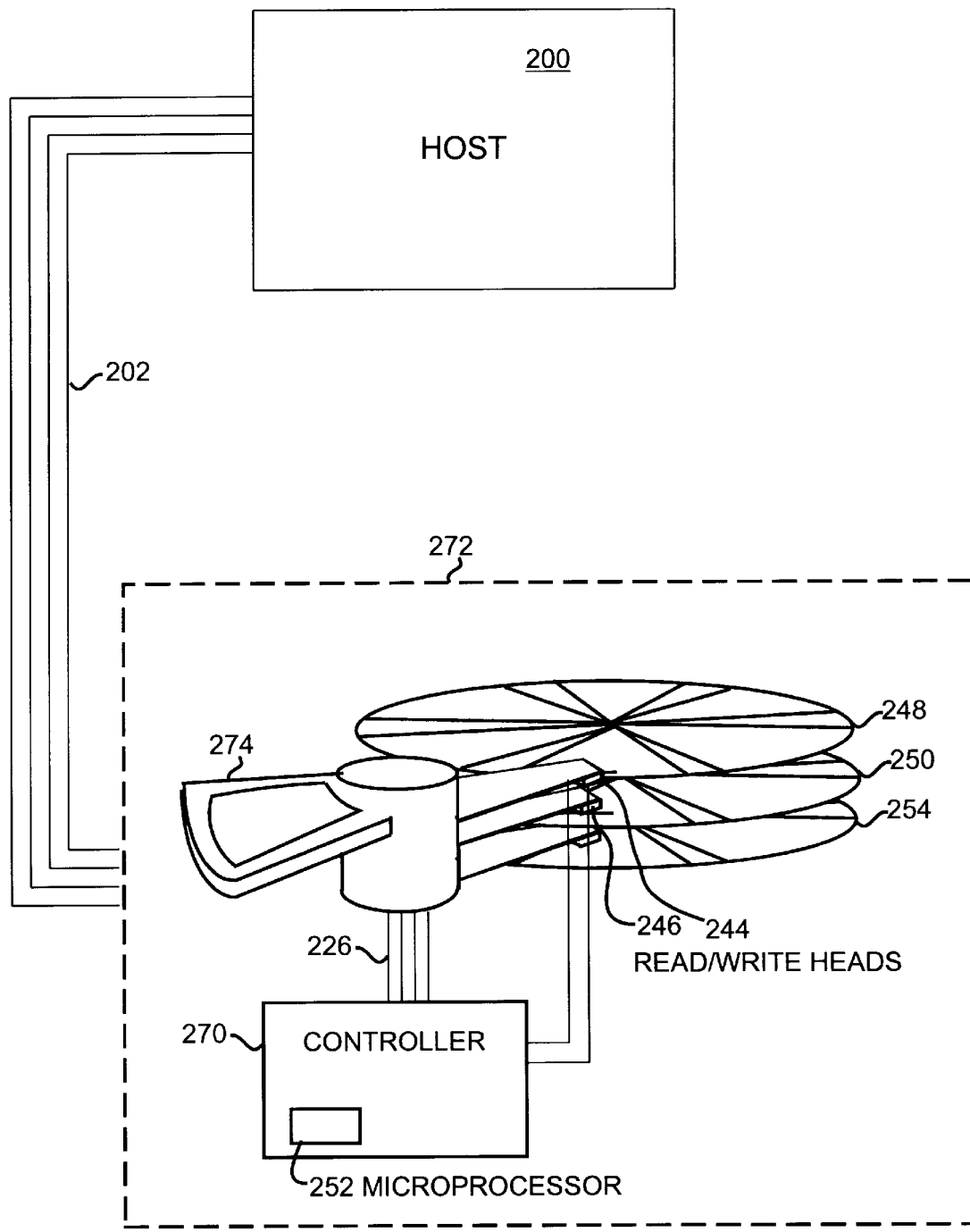
FIG. 5 shows the disk drive of the invention connected to a host computer.

Refer now to FIG. 5 which shows a disk drive 272 interfacing to a host computer 200 over a host bus 202. The host computer 200 transmits commands to read or write data to the disk drive 272 on the host bus 202. There may be multiple disks such as disk 248, disk 250 and disk 254 as well as multiple tracks on each disk in the disk drive 272. A moving arm actuator 274 seeks to a data location corresponding to the LBA specified in the command. The moving arm actuator 274 positions a read/write head, for example head 246 or head 244, that either reads or writes data on the disk. A microprocessor 252, part of controller 270, executing a firmware program, implements the command selection methods of the invention. Controller 270 controls the movement of the actuator 274 through control lines 226.

Figure 1A:
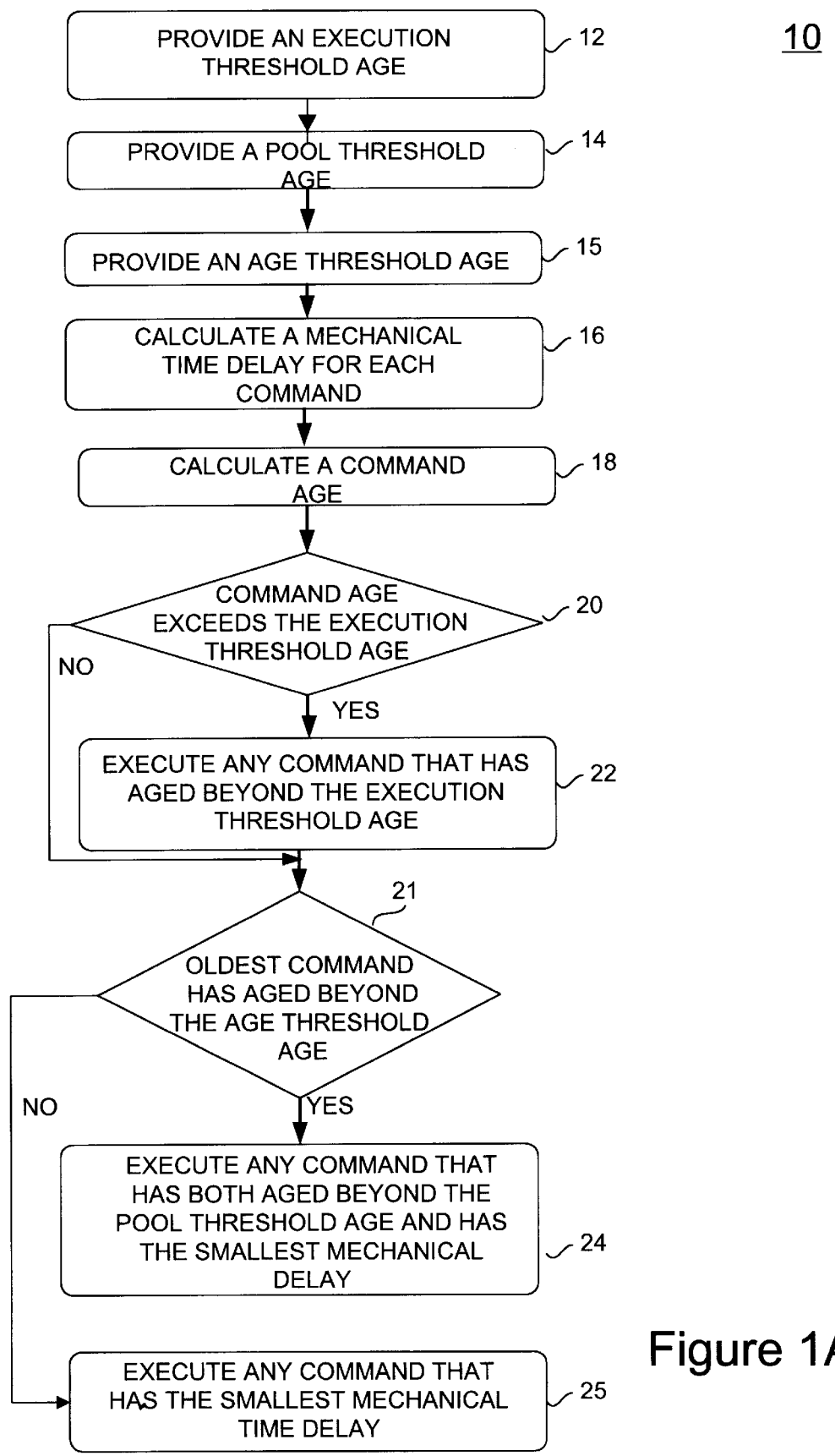
FIG. 1A is a flow chart showing the method of the invention to select a command for execution using command ages.

Refer now to FIG. 1A which shows one method of the invention 10 to manage commands in a disk drive 272 connected to a host computer 200 using a SCSI bus 202. The method of the invention starts at step 12 to provide an execution threshold age. The execution threshold age is determined prior to beginning command execution. After a command has aged beyond the execution threshold age, the command will be the next command executed. The execution threshold age is predetermined based on user requirements such as a host time-out representing a command aging limit. A typical host time-out, the time in which a host expects a single command to complete, is on the order of 5 seconds. A host may allocate more time if the drive is executing more than one command. The execution threshold age is set to be less than the time-out period. In this example the execution threshold age may be set to 4 seconds.

The method then flows to step 14 to provide a pool threshold age. The pool threshold age may be set to one half of the execution threshold age. For example, the pool threshold age could be set to 2 seconds with a 4 second execution threshold age. Other pool threshold ages may be used where a younger pool threshold age selects more commands for the pool and an older pool threshold age selects fewer commands for the pool.

The method of the invention then flows to step 15 to provide an age threshold age. The age threshold age is used to determine the application of the pool threshold. For example the age threshold age may be set to the execution threshold age minus 1 second.

The method of the invention then flows to step 16 to calculate a mechanical time delay for each command. The mechanical time delay is determined based on a seek time from the ending cylinder/head of the command currently running, to the starting cylinder/head of the new command and the rotational latency of the disk. Read commands and write commands may have different mechanical delay factors as indicated in more detail below. A piecewise linear approximation of a mechanical delay is computed as a function of cylinder/head difference as is described below. Other methods of computing a mechanical time delay may be used and are within the scope of the invention.

The invention then flows to step 18 to calculate a command age for each command. The method then flows to step 20 to check each command age against the execution threshold age and pool threshold age. The method then flows to step 22 to execute any command that has aged beyond the execution threshold age. By executing any command that has aged beyond the execution threshold age, the invention assures that the oldest command will not time-out.

The method of the invention then flows to step 21 to check if the oldest command has aged beyond the age threshold age. If the oldest command has aged beyond the age threshold age then the process flows to step 24 to execute any command that has both aged beyond the pool threshold age and has the smallest mechanical time delay. If the oldest command has not aged beyond the age threshold age then the process flows to step 25 to execute any command that has the smallest mechanical time delay. The invention adapts to the command aging environment by including every command in the pool if all the commands are young enough.

At step 24 the invention executes any command that has both aged beyond the pool threshold age and has the smallest mechanical time delay. The commands that have aged beyond the pool threshold age form the pool. The oldest command is also included in the pool. If the oldest command has the smallest mechanical time delay, known as the best difference, then the oldest command will be executed next. If another command has the best difference then that command will be executed next. The invention thus adapts to the command aging environment by flexibly including those commands that quality for the pool and disregarding other commands that are too young for the pool. In this way the invention prevents command time-outs while optimizing disk performance.

FIGS. 1B, 1C and 1D show a group of commands in three command aging environments. Commands from the host 200 are placed in a queue. When a command is received from the host 200 the command's age is computed.

FIGS. 1B, 1C and 1D show five commands, $C_0$ 82, $C_1$ 80, $C_2$ 78, $C_3$ 76 and $C_4$ 74, on an age line 11, that are to be executed by the disk drive 272. Command $C_0$ 82 is the oldest command. The remaining commands, $C_1$ 80, $C_2$ 78, $C_3$ 76 and $C_4$ 74, are in order by increasing age. $C_4$ 74 is the youngest command. The methods of the invention do not require commands to be ordered in the queue by age, but are shown here in order of age as an example.

In FIG. 1B the age of the oldest command $C_0$ 82 is greater than the execution threshold age 94. Because the age of the oldest command $C_0$ 82 is greater than the execution threshold age 94, the invention immediately schedules command $C_0$ 82 for execution. The execution threshold age 94 is set to a predetermined age, such as four seconds.

In FIG. 1C the age of the oldest command, $C_0$ 15 is greater than the age threshold age 98 and less than the execution threshold age 94. The pool threshold age 90 is set to a predetermined age such as two seconds. The age threshold age 98 is also set to a predetermined age, such as three seconds. A pool of candidate commands is thus formed. Commands $C_0$ 82, $C_1$ 80 and $C_2$ 78 are in the pool because their ages are greater than the pool threshold age 90. The invention then chooses one command among commands $C_0$ 82, $C_1$ 80 and $C_2$ 78 to execute.

In FIG. 1D all commands including the oldest command, $C_0$ 82, have not aged beyond the age threshold age 98. The invention then chooses one command from all the commands $C_0$ 82, $C_1$ 80, $C_2$ 78, $C_3$ 76 and $C_4$ 74 to execute.

Figure 2:
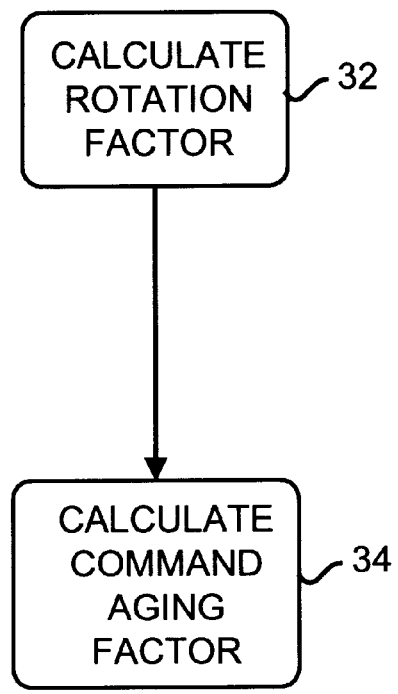
FIG. 2 shows the method of the invention to calculate a rotation factor and command aging factor.
Figure 3A:
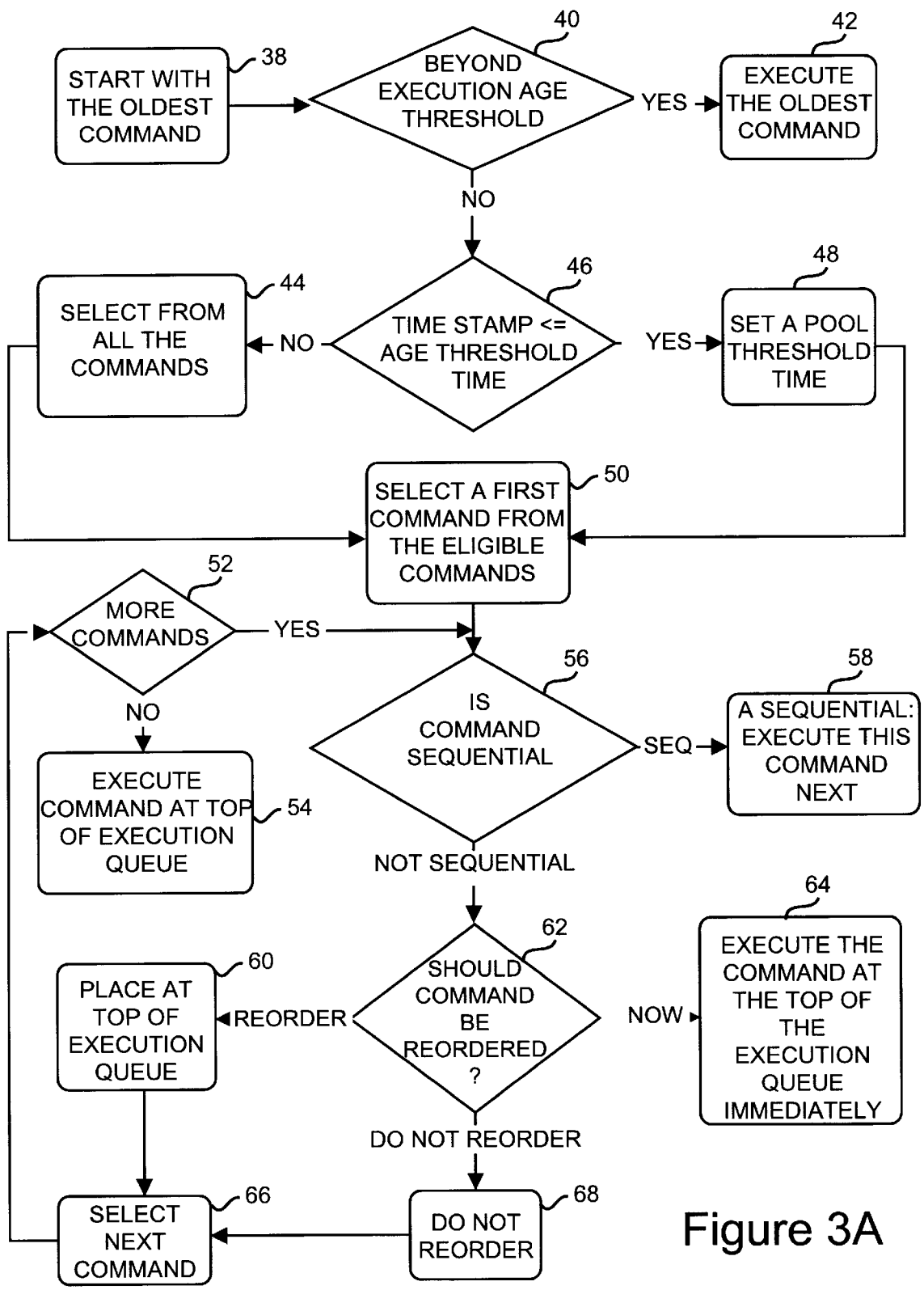
FIG. 3A is flow chart showing the method of the invention to determine command reordering using command time stamps.

FIG. 2 shows the method of the invention to initialize command reordering. The process starts at step 32 to calculate a rotation factor. The rotation factor is used to convert from a sector number to a count from the index wedge on the disk. The rotation factor compensates for changes in sector density from zone to zone. The rotation factor is used in one embodiment of the invention to perform rotational reordering which is described in more detail herein.

The method then calculates a command aging factor in step 34. The command aging factor calculated is the execution threshold age. A command aging time limit is scaled to arrive at the execution threshold age. The execution threshold age is the longest time a command may be in the queue before the command needs to be executed.

Now refer to FIGS. 3A, 3B, 3C and 3D which show the method of the invention to select a next command to execute by adaptively managing commands in a command pool. Commands to be reordered are placed in a queue. When a command is received from the host 200 a time stamp is applied to the command. This time stamp indicates the time the command will come close to timing out i.e. a deadline. The time stamp is set equal to the time the command arrived plus the execution threshold age.

FIGS. 3B, 3C and 3D show five commands, $C_0$ 15, $C_1$ 17, $C_2$ 19, $C_3$ 21 and $C_4$ 23, that are to be executed by the disk drive 272. Command $C_0$ 15 is the first and oldest command. The remaining commands, $C_1$ 17, $C_2$ 19, $C_3$ 21 and $C_4$ 23, are in order by time stamp. The methods of the invention do not require commands to be ordered in the queue by time stamp, but are shown here in order of time stamp as an example.

In FIG. 3B the current time, indicated by arrow NOW 25, occurs after the time stamp of the first and oldest command, $C_0$ 15. Because the current time is after the time stamp of command $C_0$ 15, the invention immediately schedules command $C_0$ 15 for execution.

In FIG. 3C the current time, indicated by arrow NOW 25, occurs before the time stamp of the first and oldest command, $C_0$ 15, and before an age threshold time, indicated by arrow AT 29. The pool threshold time, indicated by arrow POOL 31, is set to a predetermined amount of time after the current time, for example, 2 seconds. A pool of candidate commands is thus formed. Commands $C_0$ 15, $C_1$ 17 and $C_2$ 19 are in the pool because their time stamps occur before the pool threshold time, POOL 31. The invention then chooses one command among commands $C_0$ 15, $C_1$ 17 and $C_2$ 19 to execute.

In FIG. 3D the current time, indicated by arrow NOW 25, occurs before the age threshold time, AT 29 and all commands including the first and oldest command, $C_0$ 15, have time stamps that are after the age threshold time, AT 29. The invention then chooses one command from all the commands $C_0$ 15, $C_1$ 17, $C_2$ 19, $C_3$ 21 and $C_4$ 23 to execute.

Refer again to FIG. 3A. In step 38, the method of the invention starts with the oldest command by checking the time stamp of the command at the head of the queue, for example, command $C_0$ 15. In step 40, the method checks whether the oldest command has aged beyond the execution threshold age. If so, the invention executes the oldest command in step 42. Otherwise the method continues to step 46.

In step 46 the invention checks if the time stamp of the oldest command is less than or equal to an age threshold time, indicated by arrow AT 29. The age threshold time, AT 29, is determined from the current time, NOW 25, plus the age threshold. The age threshold may be one quarter of the execution threshold age, for example, the age threshold may be 1 second.

If in step 46, the time stamp of the oldest command is less than or equal to the age threshold time, AT, then the process flow proceeds to step 48. In step 48 the invention defines a pool threshold time, POOL 31. To calculate the pool threshold time POOL 31, a pool threshold age is added to the current time, NOW 25. The pool threshold age may be one half of the execution threshold age, for example, 2 seconds. In this way, the pool threshold time is adaptively changed based on the time stamp of the oldest command getting close to the current time. A pool of eligible commands is thus formed including the commands whose time stamps are older than POOL 31. If in step 46 the oldest command is greater than the age threshold, AT 29, then at step 44 a pool of eligible commands is formed from the entire queue of commands.

In an alternate embodiment of the invention the selection of commands for the pool may be controlled by setting the pool threshold time to a very large value. By setting the pool threshold time to a very large value the invention effectively selects every command for the pool. This mechanism provides an efficient way of selecting every command for the pool.

Now that the pool threshold time is determined and no command has exceeded the execution threshold age, the invention selects a command from the pool to execute. This selection is called command reordering. Command reordering can be done by a rotational reordering method.

In step 50, the first command is selected from the eligible commands. In step 56, the method of the invention checks if the selected command is sequential with the running command i.e. specifying LBA's which are in sequence with those specified in the running command. If it is sequential, the process flows to step 58 to execute the sequential command next. Generally, a sequential command is the most efficient command to execute next.

Figure 4A:
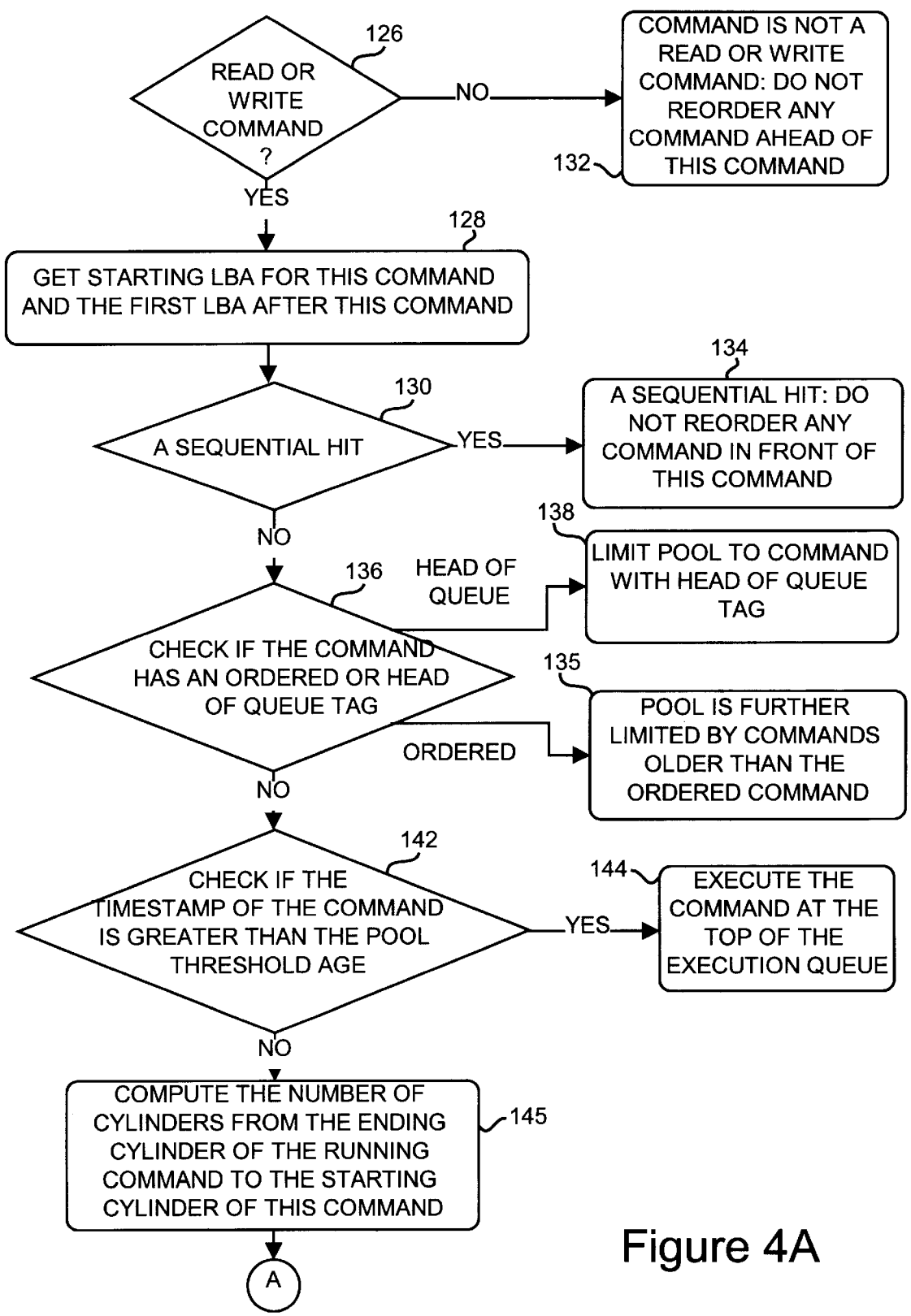
FIGS. 4A and 4B show the method of the invention to perform rotational reordering.
Figure 4B:
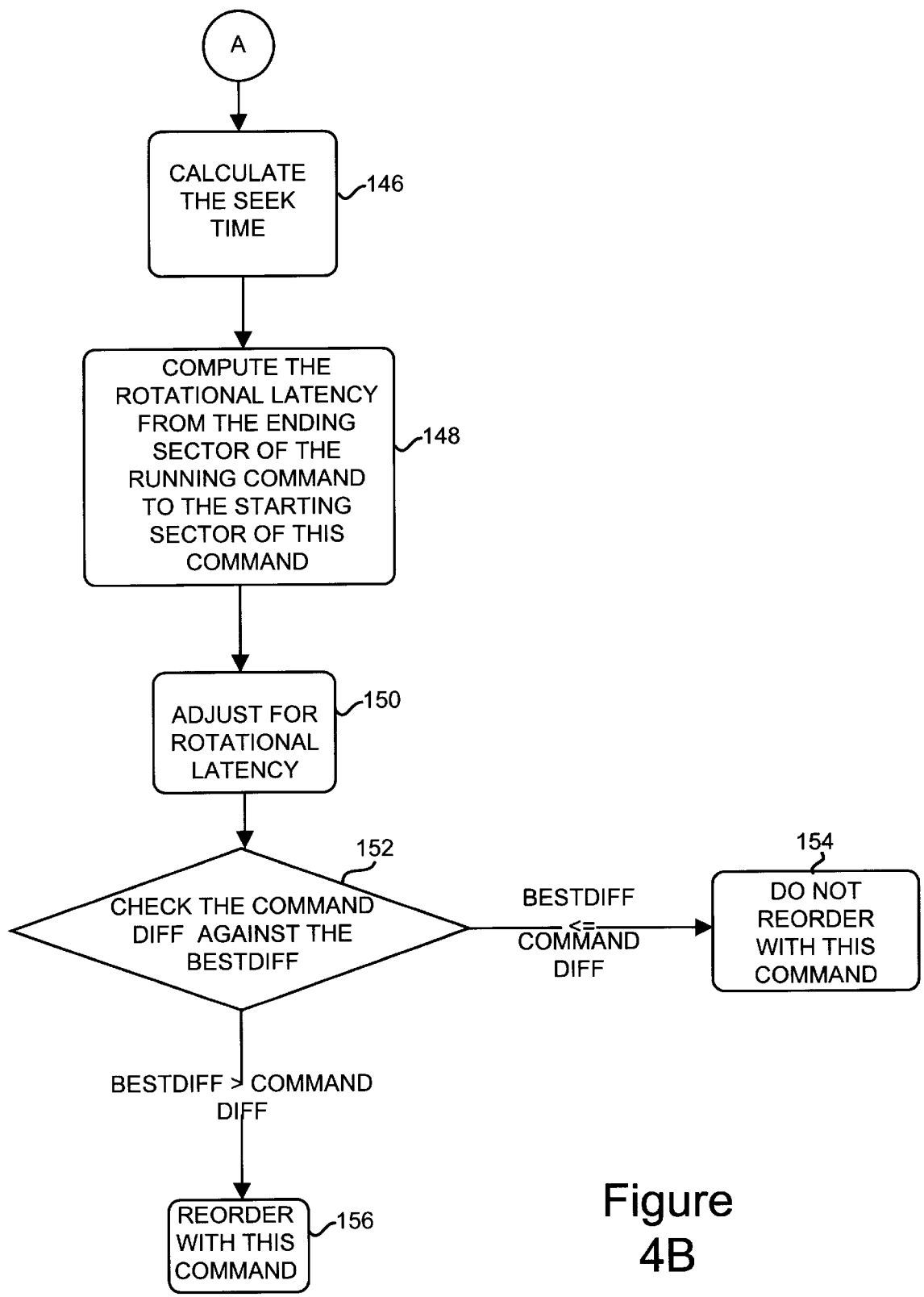

The invention prevents commands from being reordered in front of a sequential command. In step 56, if the selected command is not sequential with the running command, the process flows to step 62 to check whether the command should be reordered or executed immediately. The details of command reordering are described in FIGS. 4A, and 4B. FIGS. 4A and 4B describe rotational reordering. Other methods of reordering commands in the pool of commands are within the scope of the invention.

If the command should be executed immediately, the process flows to step 64 to execute the command at the top of the execution queue immediately. If the command is determined to be reordered, the process flows to step 60 to place the command at the top of the execution queue. Since the command is not executed immediately, the rest of the pool needs to be checked at step 52. If the command should not be reordered at step 62, the process flows to step 68 to not reorder the command and the process flows to step 66 to select the next command. After the command is placed at the top of the execution queue in step 60, the process also flows to step 66 to select the next command. At step 52 a check is made to see if there are no more commands to select from the pool. If not, the process executes the command at the top of the execution queue in step 54. If there are more commands to check in step 52, the process flows back to step 56 to see if the command is sequential with the running command. The process repeats until finally there are no more commands to process.

Refer now to FIGS. 4A and 4B, which show the method of the invention to perform rotational reordering. Rotational reordering considers the seek delay and rotational latency of the disk when selecting commands from the pool. The method of the invention starts in step 126 to check the command type to discern whether or not the command is a read or write command. If the command is not a read or write command the command cannot be reordered, no commands are reordered ahead of this command, and this command must be executed in step 132. At step 128, the starting LBA for this command and the first LBA after this command are determined. In step 130, a check is made for a sequential hit. If there is a sequential hit, the process flows to step 134, to not reorder any command in front of this command, and execute this command. If there is not a sequential hit, the process flows to step 136 to check if the command has an ordered tag or head of queue tag.

If the command has a head of queue tag then the process flows to step 138. In step 138 the pool is limited to only this command. If the command has an ordered tag then the process flows to step 135. In step 135 the pool is limited further by commands older than this ordered command.

If the command does not have a head of queue tag or an ordered tag, the process flows to step 142 to check if the time stamp of the command is greater than the pool threshold time. Since commands are considered in order of age, oldest first, if this condition is true, then no other commands need to be checked and the command at the head of the execution queue is to be executed, in step 144.

In step 145, the number of cylinders from the ending cylinder of the running command to the starting cylinder of the command under consideration is computed. The process flows to step 146 in FIG. 5B to calculate the seek time for the command. Many different methods of calculating the mechanical delay associated with a seek are available and all can be used with the invention. In one embodiment of the invention a test disk drive is placed on a test bed. Many seeks are performed with the drive. A family of plots are generated that record the amount of time it takes to seek to a range of cylinders. The family of plots is divided into a predetermined number of cases, for example four cases. Where each case represents a range of cylinders. Within each range a piecewise linear regression approximation is performed to determine a slope and intercept for a linear function estimate for the time it takes to traverse a certain number of cylinders. These estimates are obtained separately for read and write seeks.

When a command's mechanical time delay is calculated the cylinder difference from the currently executing command to the new command is computed. This cylinder difference is used to select the range of coefficients to use based also on whether the new command is a read or write command. The seek delay is then calculated from the linear estimate function derived from the test disk drive. Those skilled in the art will recognize that other higher order fits may be used such as quadratic or third order estimates. The seek delays may also be stored in a look up table addressed by cylinder difference.

The process then flows to step 148 to compute the rotational latency from the ending sector of the running command to the starting sector of this command. The process then flows to step 150 to adjust for the rotational latency. The rotational latency may then calculated as the difference, adjusted by the rotation factor, of the ending sector of the currently executing command to the starting sector of the new command. If the seek time is greater than the rotational latency, then the new command must wait for an entire revolution of the disk for the sector to be available because the seek will not get the head to the track before the new command's sector arrives. The mechanical time delay, the command difference, is then adjusted for this additional time.

The process then flows to step 152 to check if the command difference is greater or less than the best difference. If the best difference is less than or equal to the command difference, then the queue is not reordered with this command in step 154. If in step 152, the best difference is greater than the command difference, then the process reorders with this command in step 156 by placing this command on the top of the execution queue.

The Appendix contains Listing 1 which lists one embodiment of the invention written in the C/C++ programming language where, in the listings, the term "task" is equivalent to a command.

What is claimed is:

1. In a disk drive having an intelligent interface for communicating to a host, and a read/write head positioned by an actuator, where the disk drive receives a plurality of commands from the host, wherein each one of the plurality of commands has associated requested data with a data location on a disk, wherein the disk drive experiences a mechanical time delay when positioning the read/write head to the data location, and wherein the time a command was received from the host is recorded for each one of the plurality of commands, a method for selecting a next command to execute comprising the steps of:

a) providing an execution threshold age;
   b) providing a pool threshold age;
   c) providing an age threshold age;
   d) calculating a mechanical time delay for each one of the plurality of commands based on the time required to position the read/write head over the data location requested in each command;
   e) calculating a command age for each one of the plurality of commands based on a current time and the time the command was received from the host;

f) checking whether any command has aged beyond the execution threshold age and executing any command that has aged beyond the execution threshold age; and g) then checking, if no command has aged beyond the execution threshold age, if the oldest command has aged beyond the age threshold age; and if the oldest command has aged beyond the age threshold age, then executing the command that has both aged beyond the pool threshold age and has a smallest mechanical time delay; and if the oldest command has not aged beyond the age threshold age, then executing the command with the smallest mechanical time delay.

2. The method of claim 1 further comprising the step of selecting a command to execute from a pool of candidate commands based on an LBA associated with the command.

3. The method of claim 1 further comprising the step of checking if any one of the plurality of commands is a sequential command with a currently running command and, if it is, executing the sequential command.

4. The method of claim 1 further comprising the step of reordering a pool of candidate commands.

5. The method of claim 4 further comprising the step of placing a reordered command at the top of an execution queue.

6. The method of claim 5 further comprising the step of executing a command at the top of the execution queue.

7. The method of claim 4 wherein the step of reordering the commands in the pool of candidate commands comprises the steps of:

a) checking a command to determine whether the command is a read or write command, if it is not, then not reordering the command;

b) checking for a sequential hit, and if there is a sequential hit then not reordering in front of this command, but if there is not a sequential hit, then checking if the command has an ordered or head of queue tag, and if the command has a head of queue tag, then limiting the pool of commands to the command, and if the command has an ordered tag, then limiting the pool to commands older than the command;

c) calculating a seek time for the command, and computing a rotational latency, from an ending sector of the running command to a starting sector of the command to provide a command difference; and d) adjusting the command difference if the seek time exceeds the rotational latency such that the command must wait for an entire revolution of the disk; and e) checking the adjusted command difference against a best difference that is computed from the seek time of at least one other command and, if the former is better, then reordering the command.

8. The method of claim 7 wherein the step of calculating the seek time further comprises the step of modeling the seek time based on cylinder difference and extrapolating the seek time from cylinder difference.

9. The method of claim 8 wherein the step of modeling the seek time further comprises modeling the seek time with a piecewise linear regression approximation.

10. In a disk drive having an intelligent interface for communicating to a host, and a read/write head positioned by an actuator, where the disk drive receives a plurality of commands from the host, wherein each one of the plurality of commands has associated requested data with a data location on a disk, wherein the disk drive experiences a mechanical time delay when positioning the read/write head to the data location, and wherein the time a command is received from the host is recorded for each one of the plurality of commands, a method for selecting a next command to execute comprising the steps of:

a) providing an execution threshold age, an age threshold, and a pool threshold age;

b) applying a time stamp to each one of the plurality of commands that equals the time the command has arrived plus the execution threshold age;

c) checking if the time stamp of the oldest command is earlier than the current time and, if it is, then executing the oldest command, else;

d) checking if the time stamp of the oldest command is earlier than the current time plus the age threshold and, if it is, then creating a pool of candidate commands from each one of the plurality of commands whose time stamp is earlier than the current time plus the pool threshold age, else;

if it is not, then creating a pool of candidate commands from all the plurality of commands; and f) selecting a command to execute from the pool of candidate commands.

11. The method of claim 10 further comprising the step of executing the command selected from the pool of candidates.

12. The method of claim 10 further comprising the step of calculating a mechanical time delay for each command in the pool of candidate commands.

13. The method of claim 12 further comprising the step of selecting the command with a smallest mechanical time delay to execute from the pool of candidate commands.

14. The method of claim 10 further comprising the step of selecting a command to execute from the pool of candidate commands based on a LBA associated with the command.

15. The method of claim 10 further comprising the step of checking if any one of the plurality of commands is sequential with a currently running command and, if it is, executing the command that is sequential.

16. The method of claim 10 further comprising the step of reordering the commands in the pool of candidate commands.

17. The method of claim 16 further comprising the step of placing a reordered command at the top of an execution queue.

18. The method of claim 17 further comprising the step of executing the command at the top of the execution queue.

19. The method of claim 16 wherein the step of reordering the commands in the pool of candidate commands comprises the steps of:

a) checking a command to determine whether the command is a read or write command, if it is not, then not reordering the command;

b) checking for a sequential hit, and if there is a sequential hit, not reordering in front of this command, if there is not a sequential hit, checking if the command has an ordered or head of queue tag, if the command has a head of queue tag, then limiting the pool of commands to the command, and if the command has an ordered tag, then limiting the pool to commands older than the command;

c) calculating a seek time for the command, and computing a rotational latency from an ending sector of the running command to a starting sector of the command; and d) adjusting for the rotational latency and checking a best difference, wherein the best difference is computed from the seek time of at least one other command, against the rotational latency adjusted difference and if it is better reordering with the command.

20. The method of claim 19 wherein the step of calculating the seek time further comprises the step of modeling the seek time based on cylinder difference and extrapolating the seek time from cylinder difference.

21. The method of claim 20 where the step of modeling the seek time further comprises modeling the seek time with a piecewise linear regression approximation.

22. In a disk drive having an intelligent interface that supports command queuing capability of receiving a sequence of commands from a host before completion of execution of any of the sequence of commands, wherein each of the sequence of commands has, before execution thereof commences, its own age that is a function of the time elapsed after receipt from the host, and wherein each of the sequence of commands has, before execution thereof commences, its own mechanical time delay that is a function of the time required from the end of an immediately preceding access to the beginning of the access for the command, a method for selecting a next command to execute comprising the steps of:

a) providing an execution threshold age;

b) checking whether any of the sequence of commands has an age that exceeds the execution threshold age, and if such a command exists, selecting such command as the next command to execute; else c) providing a pool threshold age that is less than the execution threshold age;

d) providing an age threshold age that is greater than the pool threshold age and less than the execution threshold age;

e) checking whether any of the sequence of commands has an age that exceeds the age threshold age, and if such a command exists;

f) selecting, from the commands that each has an age that exceeds the pool threshold age, as the next command to execute the command that has the smallest mechanical time delay; else g) selecting as the next command to execute the command that has the smallest mechanical time delay.

23. The method of claim 21 further including the step of checking if any of the sequence of commands is a sequential command having a target block address range which is sequential to a target block address range for a currently running command and if it is, selecting the sequential command as the next command to execute.

24. The method of claim 21 wherein the step (f) of selecting as the next command to execute the command that has the smallest mechanical time delay further comprises the steps of:

a) calculating a seek time for each of the sequence of commands; and b) computing a rotational latency for each of the sequence of commands.

25. In a disk drive having an intelligent interface that supports command queuing capability of receiving a sequence of commands from a host before completion of execution of any of the sequence of commands, wherein each of the sequence of commands has, before execution thereof commences, its own age that is a function of the time elapsed after receipt from the host, and wherein each of the sequence of commands has, before execution thereof commences, its own mechanical time delay that is a function of the time required from the end of an immediately preceding access to the beginning of the access for the command, a method for selecting a next command to execute comprising the steps of:

a) providing an execution threshold age;

b) checking whether any of the sequence of commands has an age that exceeds the execution threshold age, and if such a command exists, selecting such command as the next command to execute; else c) providing a pool threshold age that is less than the execution threshold age;

d) providing an age threshold age that is greater than the pool threshold age and less than the execution threshold age;

e) checking whether any of the sequence of commands has an age that exceeds the age threshold age, and if such a command exists, including the command in a pool of candidate commands; and f) re-ordering the pool of candidate commands to select the next command to execute.

26. The method of claim 25 wherein the step f) of re-ordering the pool of candidate commands further includes the step of checking if one of the pool of candidate commands is a sequential command having a target block address range which is sequential to a target block address range for a currently running command and if it is, selecting the sequential command as the next command to execute.

* * * * *